(12) United States Patent
Palandurkar

(10) Patent No.: US 10,135,943 B2
(45) Date of Patent: Nov. 20, 2018

(54) AUTOMATED AND INTEGRATED SYSTEM FOR TOURNAMENT LOGISTICS AND SERVICES USING INTERNET, ELECTRONIC DEVICES, AND METHODS THEREOF

(71) Applicant: V GROUP INC., Cranbury, NJ (US)

(72) Inventor: Vijay Kumar Palandurkar, West Windsor, NJ (US)

(73) Assignee: V Group Inc., Cranbury, NJ (US)

( * ) Notice: Subject to any disclaimer, the term of this patent is extended or adjusted under 35 U.S.C. 154(b) by 213 days.

(21) Appl. No.: 15/047,622

(22) Filed: Feb. 18, 2016

(65) Prior Publication Data
US 2016/0317916 A1 Nov. 3, 2016

Related U.S. Application Data

(60) Provisional application No. 62/155,463, filed on Apr. 30, 2015.

(51) Int. Cl.
| | | |
|---|---|---|
| *A63F 9/24* | (2006.01) | |
| *H04L 29/08* | (2006.01) | |
| *A63F 13/87* | (2014.01) | |
| *A63F 13/79* | (2014.01) | |
| *A63F 13/795* | (2014.01) | |
| *A63F 13/533* | (2014.01) | |
| *A63F 13/828* | (2014.01) | |

(52) U.S. Cl.
CPC .......... *H04L 67/306* (2013.01); *A63F 13/533* (2014.09); *A63F 13/79* (2014.09); *A63F 13/795* (2014.09); *A63F 13/828* (2014.09); *A63F 13/87* (2014.09)

(58) Field of Classification Search
None
See application file for complete search history.

(56) References Cited

U.S. PATENT DOCUMENTS

| | | |
|---|---|---|
| 5,359,510 A | 11/1994 | Sabaliauskas |
| 5,855,516 A | 1/1999 | Eiba |
| 7,682,251 B2 | 3/2010 | Bortnik |
| (Continued) | | |

OTHER PUBLICATIONS

Desney S. Tan et al., "AdaptiviTree: Adaptive Tree Visualization for Tournament-Style Brackets," IEEE Transactions on Visualization and Computer Graphics, vol. 13, No. 6, Nov./Dec. 2007, pp. 1113-1120.

*Primary Examiner* — Paul A D'Agostino
(74) *Attorney, Agent, or Firm* — Kanika Radhakrishnan; Evergreen Valley Law Group

(57) ABSTRACT

An automated and integrated system for managing tournament logistics and services with Internet, electronic devices, and methods thereof. The method includes creating tournaments, events, seasons, and enabling participations. The method also includes creating profile-integrated brackets and automated seeding. Further, the method includes displaying a list of player profiles, tournaments, events, seasons, and a list of players participating in the tournaments, events and seasons to a user. Moreover, the method includes permitting the user to send and respond to real-time notifications and tweet event information automatically. The method also includes synchronizing data when the user swaps between offline and online status to provide continuity to the tournament management and experience.

20 Claims, 17 Drawing Sheets

(56) References Cited

U.S. PATENT DOCUMENTS

| | | | |
|---|---|---|---|
| 9,177,445 B2 | 11/2015 | Vemuri | |
| 2007/0026935 A1* | 2/2007 | Wolf | G07F 17/32 |
| | | | 463/25 |
| 2009/0292640 A1* | 11/2009 | Heatherly | A63F 13/12 |
| | | | 705/51 |
| 2010/0004055 A1* | 1/2010 | Gormley | G07F 17/32 |
| | | | 463/25 |
| 2010/0113162 A1* | 5/2010 | Vemuri | G07F 17/3267 |
| | | | 463/42 |
| 2011/0009181 A1* | 1/2011 | Speer, II | G07F 17/32 |
| | | | 463/20 |
| 2011/0320375 A1* | 12/2011 | Zrike | G06Q 10/107 |
| | | | 705/319 |
| 2015/0111642 A1* | 4/2015 | Lawson | G07F 17/3276 |
| | | | 463/31 |

* cited by examiner

CREATE TOURNAMENT

UPLOAD TOURNAMENT ICON

TOURNAMENT NAME

WEB URL

SINGLE

GAME

START DATE | END DATE

STARTING HOUR | ENDING HOUR

Exclusive Twitter kit for the tournament

Default tweet

Notification message

FIG. 8c

AUTOMATED AND INTEGRATED SYSTEM FOR TOURNAMENT LOGISTICS AND SERVICES USING INTERNET, ELECTRONIC DEVICES, AND METHODS THEREOF

TECHNICAL FIELD

Embodiments of the disclosure relate generally to the field of event management. Embodiments relate more particularly for providing an automated and integrated system for managing tournament logistics and providing and receiving tournament services using electronic devices and Internet.

BACKGROUND

A tournament is a competition run by an organizer, involving a number of players and fans, all participating in a sport or a game and involves a number of matches organized into brackets and pools. The base unit of a bracket has two players and the winner of a bracket advances to compete with an opponent. For a large number of players, the organizer may wish to divide the number of players into groups, also known as, pools. In some situations, a number of players form a team to compete against another team. Further, there are 4 types of bracket-style tournament, single elimination, double elimination, round robin, and Swiss. Hence, managing tournaments is an essential feature and usually implements a Tournament Management System (TMS).

Tournaments, events, and seasons form a hierarchical competition structure that is used for organizing multiple tournaments across time and space. A tournament is a standard sized competition consisting of pools and brackets. An event is a larger sized competition consisting of one or more tournaments. A season is the largest sized competition consisting of one or more tournaments as well as one or more events. A stakeholder in a tournament can be a tournament organizer, a single player, a team of players, or a fan. A user of an application for this integrated system can play one or more roles of stakeholders.

As tournament organizers organize a tournament, many utilize software tools to keep track of players participating in their tournament, determine player seeding, and record competition results. In addition, tournament organizers can wish to use a software tool to keep track of tournament finances such as fees and expenses, and to use social media to market and promote their tournaments.

While all of the resources a tournament organizer may need to effectively organize and market a tournament may be available, the resources may not be centralized or easily accessed from any location by any means. For example, some resources may not be available across different software platforms and electronic devices.

As tournament players, teams, or fans, many can wish to have a record of which tournament they and others have appeared in and to share their experience with others via social media. In addition, they can wish to use a software tool to keep track of these records. Also, they can wish to use a software tool to be given real-time notification or live information about when they and others are appearing in a match. Further, players and teams can wish to use a software tool to respond to this real-time notification, informing the tournament organizer of their availability to participate in their match.

Today, TMS has been refined with technology. Existing applications using the technologies are deficient in providing a well-integrated and fully-automated combination of software and hardware functions for data management and communication to effectively provide and receive live tournament services to satisfy all stakeholder or user needs in both online and offline modes. Further, today's applications are platform specific. Another major drawback of today's applications is denying crucial online based services when the user is in an offline mode. Those crucial yet unavailable online services include creating new tournaments, adding players, marking winners and losers in each pool and bracket.

In light of the above limitations, there appears to be a need for automating and integrating tournament logistics and services available to desktop, web and electronic devices.

OBJECT OF INVENTION

The principal object of the embodiments herein is to provide a tool for unifying tournament logistics and services into a single, integrated system and application available to desktop, web and electronic devices.

Another object of the embodiments herein is to provide tournament organizers, players, player teams, fans, other participants, streamers, the industry, the viewing public and any interested party a satisfied overall experience.

SUMMARY

The above-mentioned needs are met by an automated and integrated system, a computer-implemented method and computer program product for managing tournament logistics and services.

An example of a computer-implemented method to provide an automated and integrated system for tournament logistics and services includes allowing a user, who can be a tournament service provider, to create tournaments, events, and seasons; each containing pools and brackets. There are four types of bracket-style tournaments: single elimination, double elimination, round robin and Swiss. Further, the computer-implemented method includes creating profile-integrated brackets and automated seeding. A user, who is a player, a player team, or a fan, can sign up with the system, create a profile and specify a preferred setting to use the application. Furthermore, the computer-implemented method includes displaying a list of player profiles, tournaments, events, and seasons, as well as a list of players participating in tournaments, events, and seasons to the user. At any time, the computer-implemented method includes permitting a user to send or respond to real-time notifications, and tweet event information automatically. Using Short Message System (SMS) for notifications is an extension of the method. The computer-implemented method also synchronizes data when a user swaps between offline and online status to provide continuity to the tournament management and experience.

An example of a computer program product to provide an automated and integrated system for tournament logistics and services includes allowing a user, who can be a tournament service provider, to create tournaments, events, and seasons; each containing pools and brackets. There are four types of bracket-style tournaments: single elimination, double elimination, round robin and Swiss. Further, the computer program product includes creating profile-integrated brackets and automated seeding. A user, who is a player, a player team, or a fan, can sign up with the system, create a profile and specify a preferred setting to use the application. Furthermore, the computer program product includes displaying a list of player profiles, tournaments, events, and seasons, as well as a list of players participating in tournaments, events, and seasons to the user. At any time, the computer program product includes permitting a user to send or respond to real-time notifications, and tweet event information automatically. Using Short Message System (SMS) for notifications is an extension of the method. The computer program product also synchronizes data when a user swaps between offline and online status to provide continuity to the tournament management and experience.

An example of a system for managing tournament logistics and services includes a computing device. The system also includes a database to store data related to tournaments, events, seasons, user profile data and bracket details and a network. Further the system includes a processing module configured within the computing device and operable to perform: create tournaments, events, and seasons, and enabling participations; create profile-integrated brackets and automated seeding; display a list of player profiles, tournaments, events, seasons, and a list of players participating in the tournaments, events and seasons to a user; permit the user to send and respond to real-time notifications and tweet event information automatically and synchronize data when the user swaps between offline and online status to provide continuity to the tournament management and experience.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS AND DRAWINGS

In the accompanying figures, similar reference numerals may refer to identical or functionally similar elements. These reference numerals are used in the detailed description to illustrate various embodiments and to explain various aspects and advantages of the present disclosure.

FIG. 8a, FIG. 8b, FIG. 8c, FIG. 8d, FIG. 8e, FIG. 8f, FIG. 8g, FIG. 8h, FIG. 8i are exemplary schematic views of the application, according to the embodiments as disclosed herein.

DETAILED DESCRIPTION OF THE EMBODIMENTS

The above-mentioned needs are met by an automated and integrated system, a computer-implemented method and computer program product for managing tournament logistics and services using the Internet and electronic devices. The following detailed description is intended to provide example implementations to one of ordinary skill in the art, and is not intended to limit the invention to the explicit disclosure, as one of ordinary skill in the art will understand that variations can be substituted that are within the scope of the invention as described.

Figure 1:
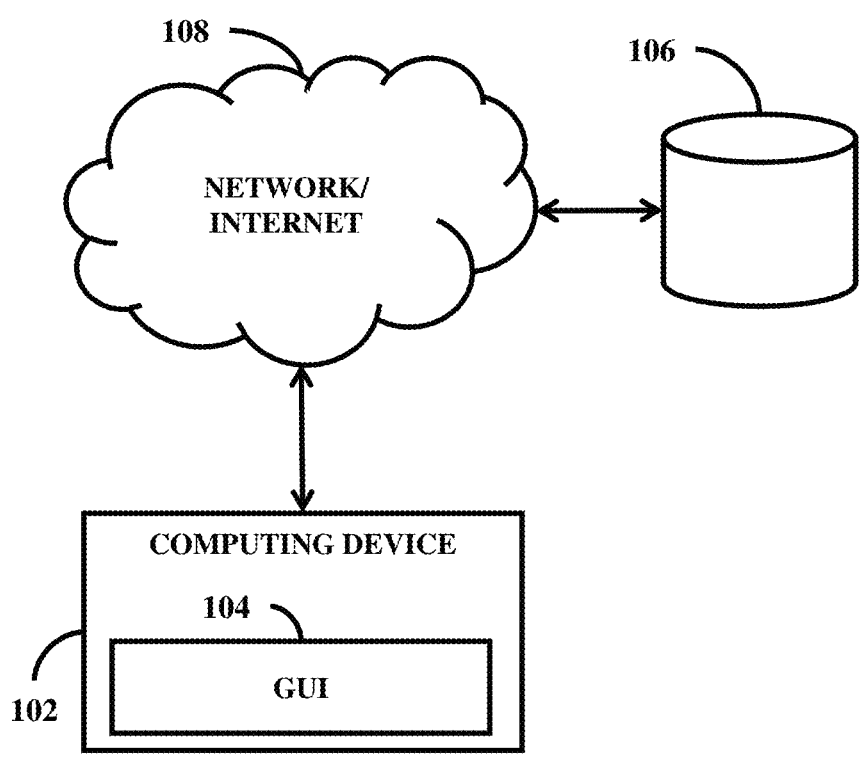
FIG. 1 is a block diagram of the environment, according to the embodiments as disclosed herein.

In a specific embodiment, the integrated system can be used by all participants such as organizers, players, and fans. Environment Block Diagram FIG. 1 is a block diagram of the environment, supporting a user who can be a tournament organizer, player, team player, and/or fan, according to the embodiments as disclosed herein. The environment 100 includes a computing device 102, a database 106 and network 108.

Typically, the computing device 102 is a portable computing device such as a cell phone, smart phone, Android devices and iOS devices. The computing device 102 comprises a non-transitory computer-readable medium, the contents of which causes the computing device 102 to perform the method disclosed herein. In some embodiments, the computing device 102 may be replaced by desktops, laptops, notebooks, tablets and other types of wireless or wired computing devices suitable for this purpose.

Further, the computing device 102 includes a graphical user interface (GUI) 104 to facilitate interaction with a user of the computing device 102.

The database 106 is responsible to store data related to tournaments, events, and seasons. User profile data and bracket details are also stored in the database 106. A bracket is a tree diagram that represents the series of matches played during a tournament.

Examples of the network 108 include, but are not limited to, wireless network, wire line network, public network such as the Internet, private network, General Packet Radio Network (GPRS), Local Area Network (LAN), Wide Area Network (WAN), Metropolitan Area Network (MAN), cellular network, Public Switched Telephone Network (PSTN), personal area network, and the like. For example, the network 108 can be operable with cellular networks, Wi-Fi networks, or any other networks or combination thereof.

The user of the computing device 102 logs into the application utilized to perform the method described herein. The application is "user-centric" and can be used by the user who is an organizer, a player, a team player, or fan of a tournament, event or season. Following the sign-up procedure, the user creates a user profile. The user can also change or edit settings to use the application. The user, who is a tournament organizer, can create, add and edit tournaments, events, and seasons using the application.

Operational Flow Diagram

Figure 2:
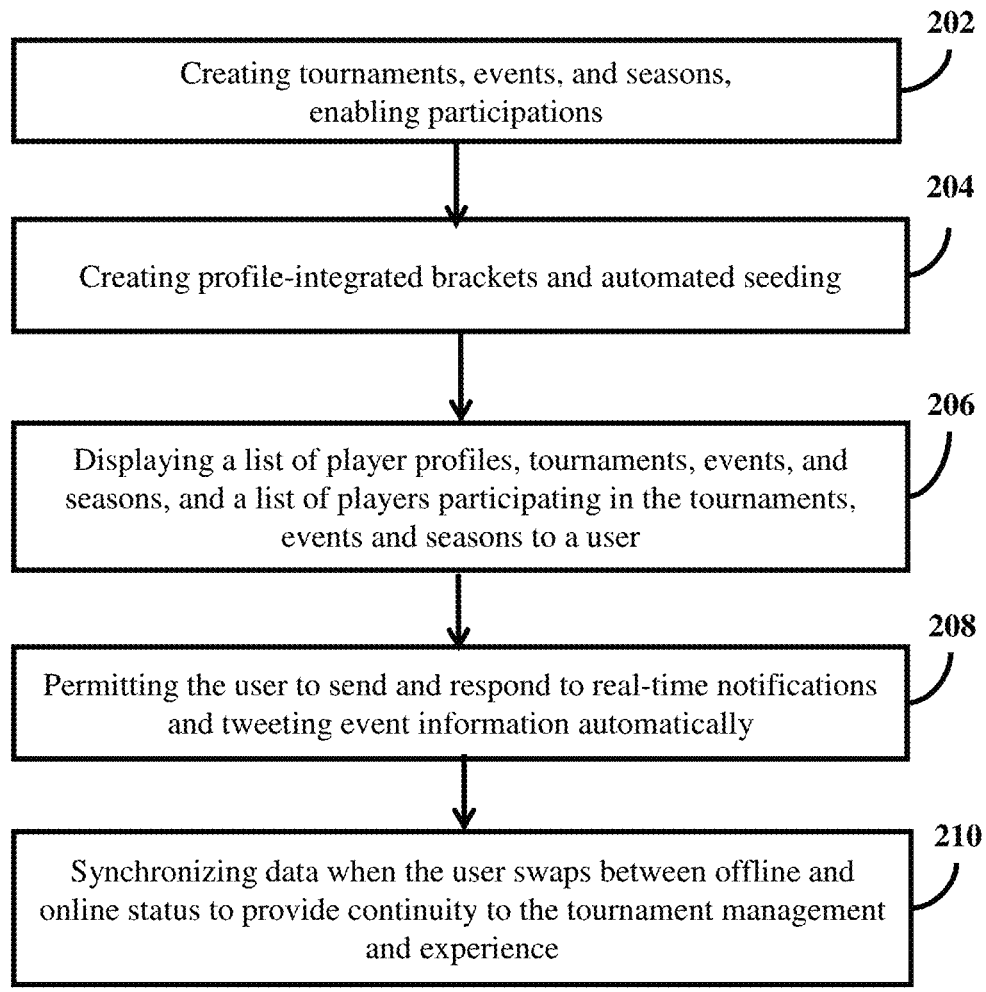
FIG. 2 is flow diagram describing a method for automating and managing tournament logistics and services, according to the embodiments as disclosed herein.

FIG. 2 is a flow diagram describing a method for automating and managing tournament logistics and services, according to the embodiments as disclosed herein. The method begins at step 202.

At step 202, tournaments, events, and seasons are created, and player and fan participation are enabled.

At step 204, profile-integrated brackets and automated seeding are created.

At step 206, a list of player profiles, tournaments, events, seasons and a list of players participating in the tournaments, events and seasons are displayed to a user.

At step 208, the user is permitted to send and respond to real-time notifications and tweeting event information automatically.

At step 210, data is synchronized when the user swaps between offline and online status to provide continuity to the tournament management and experience.

Further, the application used to perform the method described herein is integrated for software, hardware and $3^{rd}$ party utility tools. Furthermore, the application is executed in a multi platform environment.

The method ends at step 210.

It will be appreciated for those skilled in the art that the method described in FIG. 2 may not follow the same sequence of steps as mentioned and may be interchanged.

Schematic Representation of Functions

Figure 3:
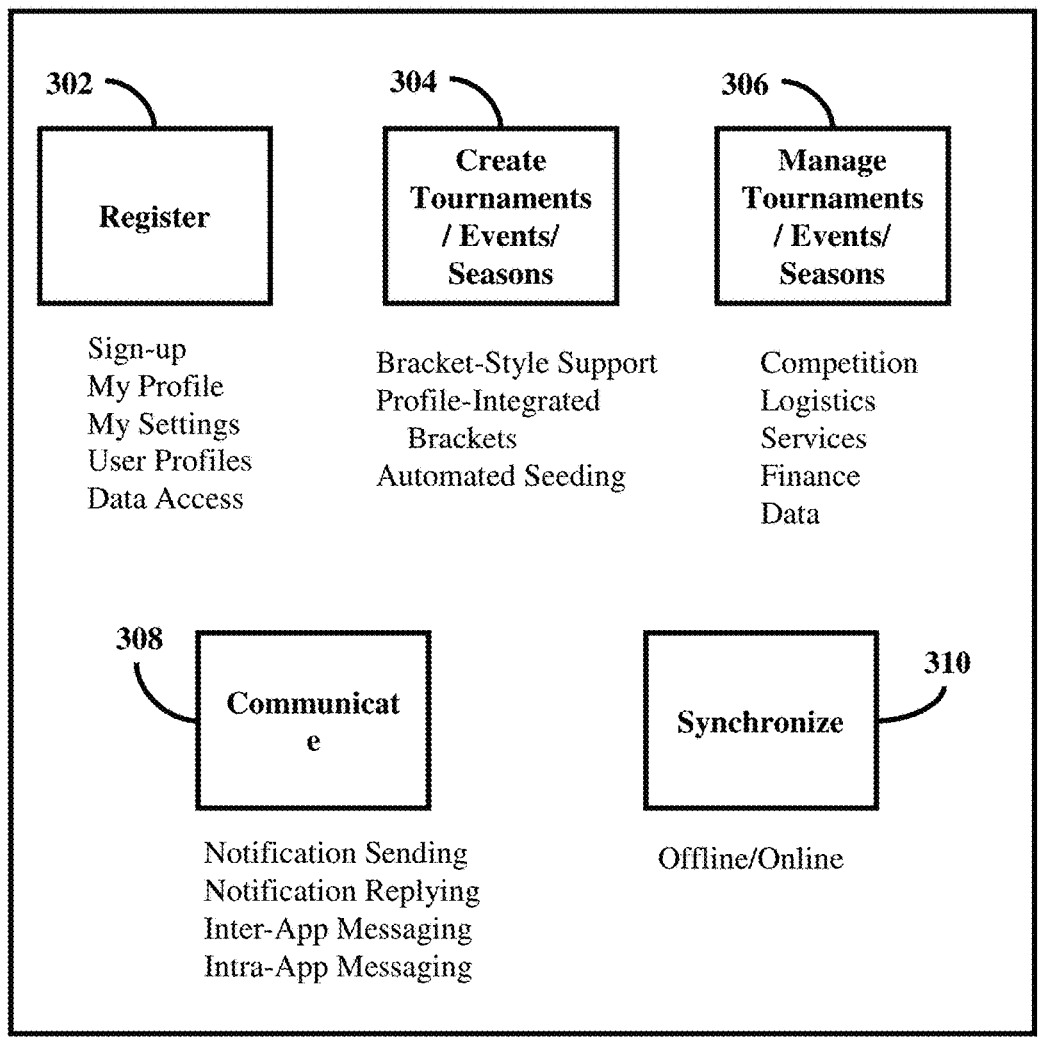
FIG. 3 is a diagram describing the functions in the automated and integrated system for tournament logistics and services available to a user, who can be a tournament organizer, player, player team, and/or fan, according to the embodiments as disclosed herein.

FIG. 3 is a schematic representation of functions available in the automated and integrated system for tournament logistics and services to a user, according to the embodiments as disclosed herein. The user can be a tournament organizer, player, player team, and/or fan.

As shown in FIG. 3, a user can register 302 by signing up for the integrated system. The registered user can set up a default or a customized profile (photos, images, personal statement) and a preferred setting for using the application. The user can view public profile information of other users and available tournament, event, season information.

For a user whose role is to create a tournament, an event, or a season 304, in addition to standard brackets, the system provides an option for profile-integrated brackets and an automated seeding.

To manage a tournament, event, or season 306, the system provides functions to process bracket data updates, logistics behind the scene, services tangible and intangible to users, financial profit and loss (such as integrating with a $3^{rd}$ party payment processing system), and a database of target tournament, event, season information across time and space.

Supporting these functions in real-time are two baseline mechanisms, a communication mechanism 308 and an online-offline data synchronization mechanism 310.

Through the communication mechanism 308, a tournament organizer can send real-time notification to a user and the user can respond in kind. Further, a user can access the Internet as governed by user's preference settings for communication within the application.

In the data synchronization mechanism 310, data is synchronized when the user swaps between offline and online status. In the offline status, the user is unable to access any online hosted data or services such as player profiles, twitter notifications, past tournament data. However, user will still be able to create new tournaments, add players, mark winners and losers in each pool and bracket. In the online status, the data is synchronized in a seamless pattern.

The method described herein is beneficial to competitive tournament organizers. Moreover, any event that utilizes bracket style tournament could implement the method. Further, the method is advantageous for several reasons as listed below, 1. Effective and efficient functions to manage live bracket-style tournaments.
2. Up-to-date tournament data accessibility and easy link to live streams.
3. Real-time communication ability for notification sending and responding, and connection to social- and multi-media.
4. Tracking past and present user profiles and player statistics.
5. Maximum operation and service continuity via synchronization between online and offline modes.
6. Operable on multiple platforms such as mobile, desktop and web (Multi-Platform Support).

Operational Flow Diagrams

Figure 4:
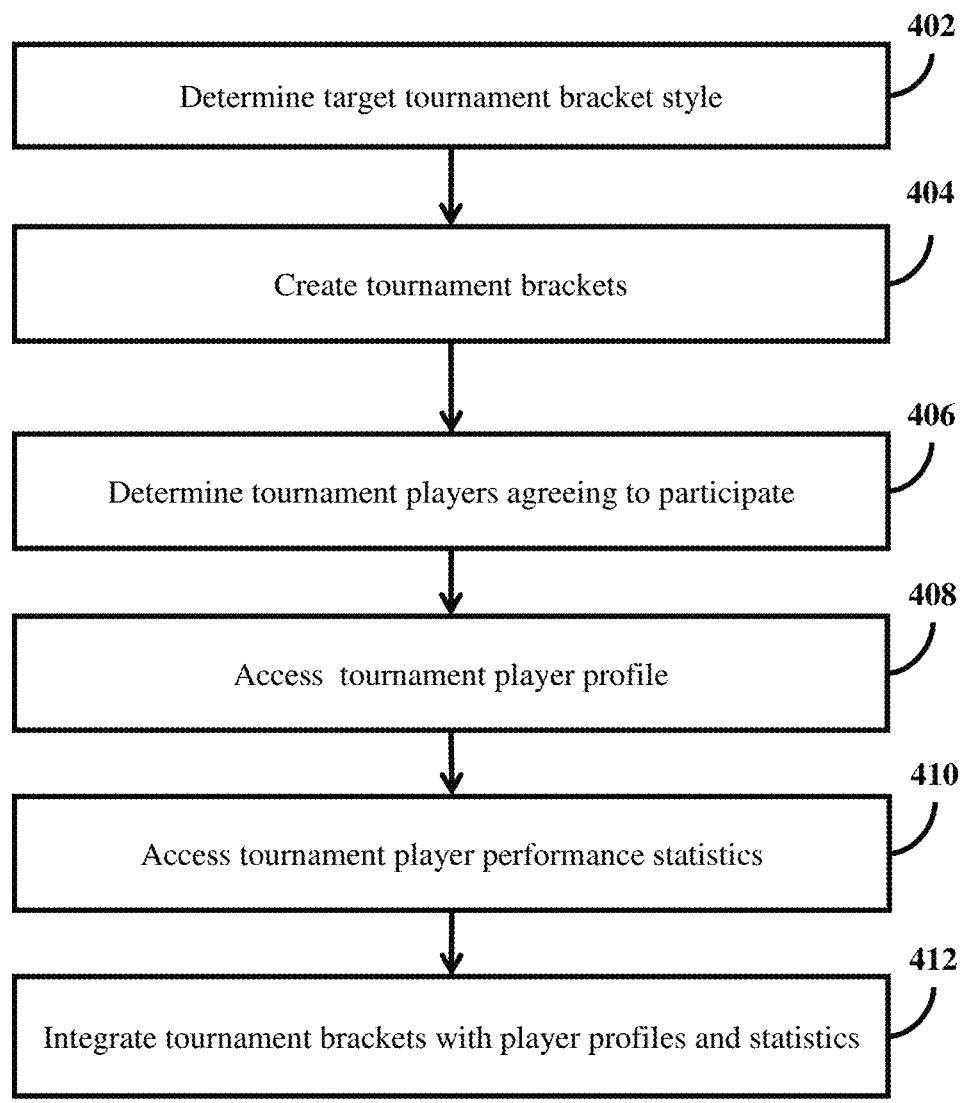
FIG. 4 is a flow diagram describing the profile-integrated bracket function available to tournament organizers when creating tournaments, according to the embodiments as disclosed herein.

FIG. 4 is a flow diagram describing the method for the profile-integrated bracket function, according to the embodiments as disclosed herein. The method begins at step 402.

At step 402, the method described in FIG. 4 first determines the target bracket style.

At step 404, the method creates the bracket for the target tournament.

At step 406, the method determines the players or player teams who have agreed to participate in the bracket.

At step 408, the method allows access to profiles of tournament players.

At step 410, tournament player performance statistics is accessed.

At step 412, the method finally integrates the tournament brackets with accessed profile and data (statistics) into the target brackets.

The method ends at step 412.

Figure 5:
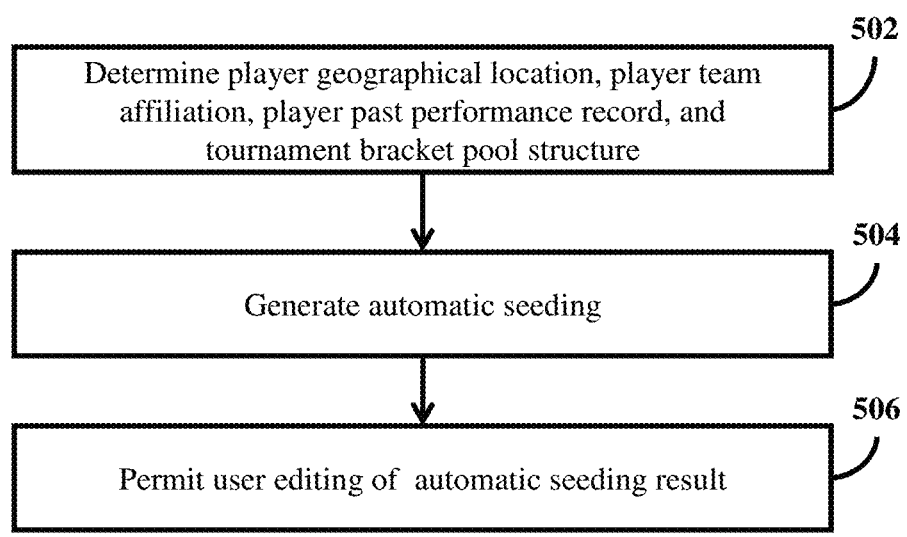
FIG. 5 is a flow diagram describing the automated seeding function available to a tournament organizer when creating tournaments, according to the embodiments as disclosed herein.

FIG. 5 is a flow diagram describing the method for the automated seeding function, according to the embodiments as disclosed herein.

The algorithm used in automated seeding method is based on user-selected parameters. The flow diagram of FIG. 5 shows one set of such parameters.

At step 502, the seeding priority is determined by a combination of player data including geographical location, team affiliation, and past performance record, and the pool structure, if applicable, of the target tournament.

At step 504, an automated seeding is generated based on user-selected parameters described in step 502.

At step 506, the user is allowed to further edit the automated seeding result to customize. The method ends at step 506.

Figure 6:
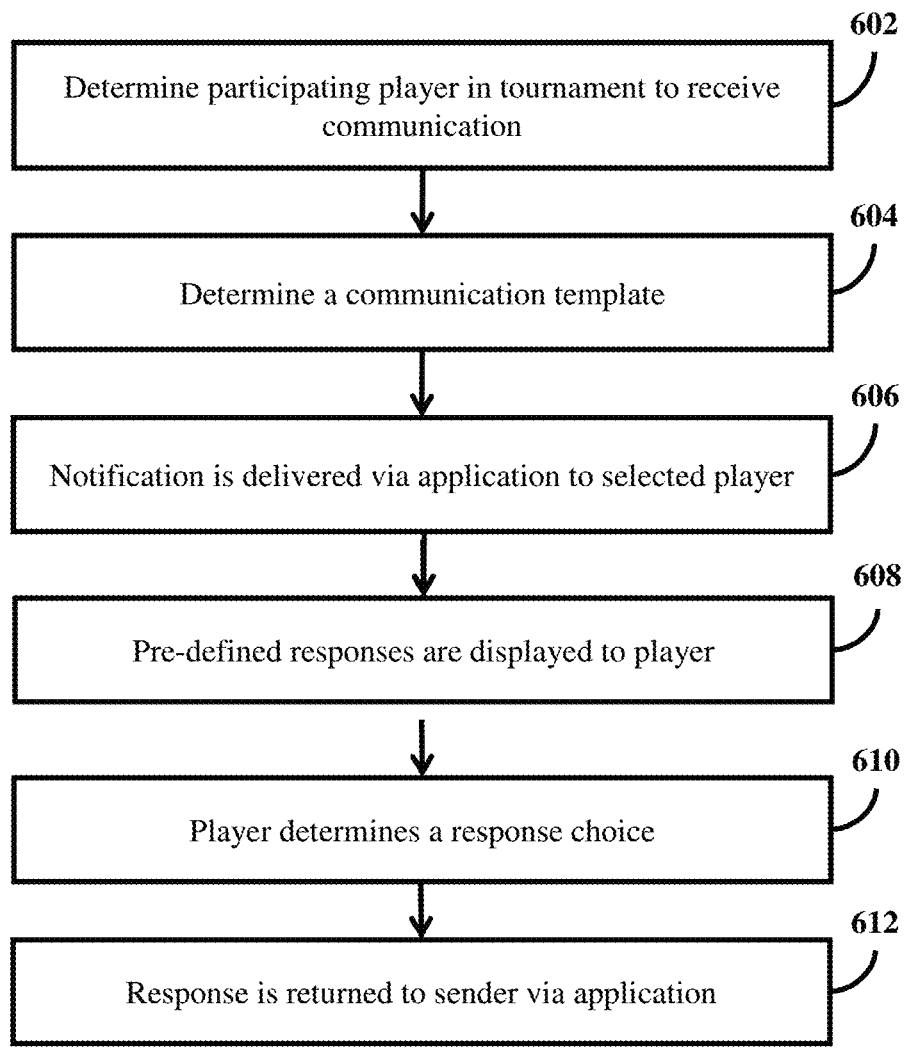
FIG. 6 is a flow diagram describing one of the communication mechanisms available for a user to send notification and the receiving user to respond to the notification, according the embodiments as disclosed herein.

FIG. 6 is a flow diagram describing the method for the application to application communication mechanism available to the users, in particular, to send notification and to respond to the notification, according to the embodiments as disclosed herein. The method begins at step 602.

At step 602, the participating player in a tournament is determined to be receiving a communication.

At step 604, a communication template is determined.

At step 606, the notification is delivered via the application to the selected participating player. The communication for such purpose is limited to a pre-defined set of notification choices ("time until match start", "late warning", "disqualification", etc.).

At step 608, in addition to displaying the notification message, the application displays a set of pre-defined response choices ("on my way", "unable to participate", etc.).

At step 610, the player determines a response choice.

At step 612, upon determining a response, the response is communicated to the sender via the application. The method ends at step 612.

Figure 7:
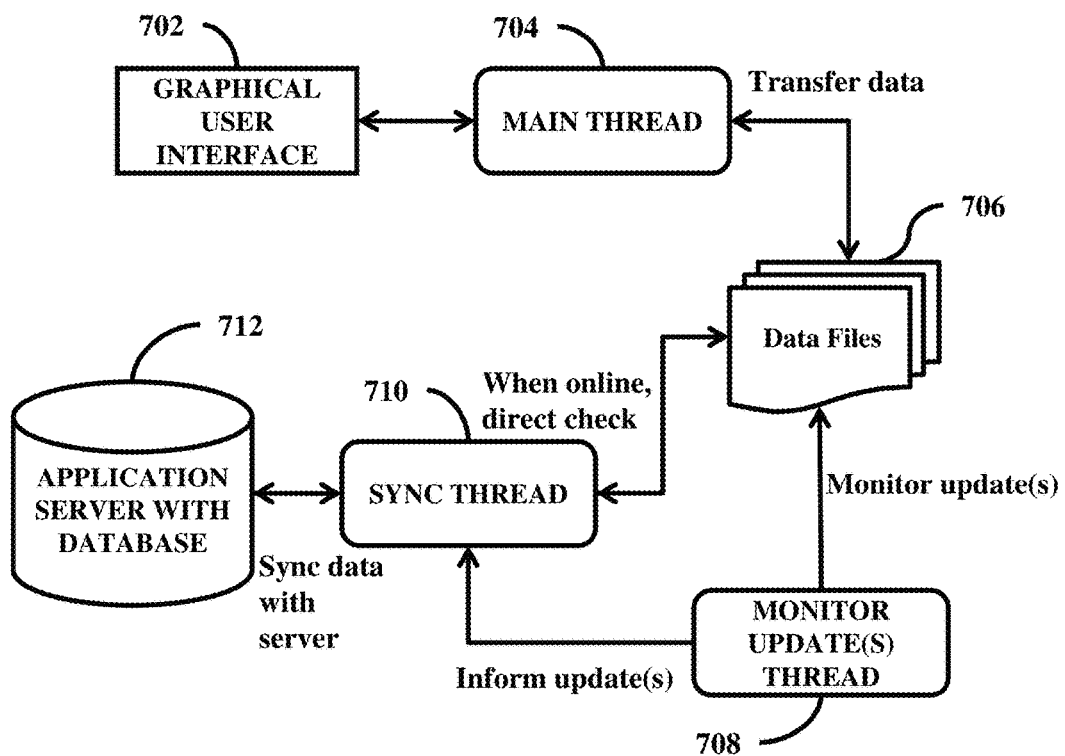
FIG. 7 is a flow diagram describing the data synchronization function available to switch between offline and online modes of a user, according to the embodiments as disclosed herein.

FIG. 7 is a block diagram describing the method for the data synchronization mechanism between offline and online modes of a user, according to the embodiments as disclosed herein.

The block diagram includes three threads namely a main thread 704, a sync thread 710 and a monitor update(s) thread 708. The functionalities of the threads are as follows:
1. Main thread 704: Is responsible to transfer data between the Graphical User Interface 702 and the data files 706. The data files 706 contain but are not limited to a plurality of entities for user profile, tournament, event, and season specific data, and application programming interface (API) related data. The database 712 stores data in folders, each containing but is not limited to, data entities for user profiles, tournaments, events, and seasons.
2. Monitor Update(s) thread 708: Constantly monitors for any updates in the data files 706. Further, the Monitor Update(s) thread 708 informs and notifies the Sync thread 710 in case of any update(s).
3. Sync thread 710: Is responsible for data synchronization between the data file 706 and the database 712. When the user is online, the sync thread 710 synchronizes data files 706 and the database 712 directly. At other times, the sync thread 710 synchronizes the data files 706 and the database 712 in response to signals from Monitor Update(s) thread 708.

Exemplary Schematic Views

FIG. 8a-FIG. 8i are exemplary schematic views of the application, according to the embodiments as disclosed herein.

Figure 8A:
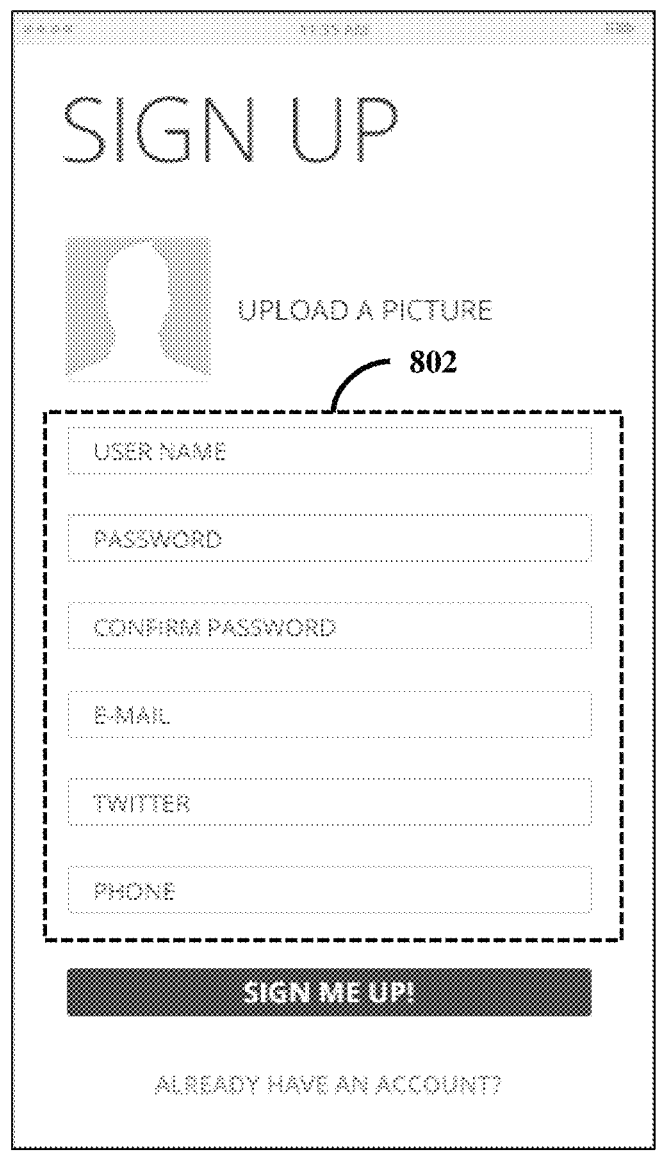

FIG. 8a is a schematic illustration of a registration page, according to the embodiments as disclosed herein. The registration page allows the user to input a plurality of details 802.

Figure 8B:
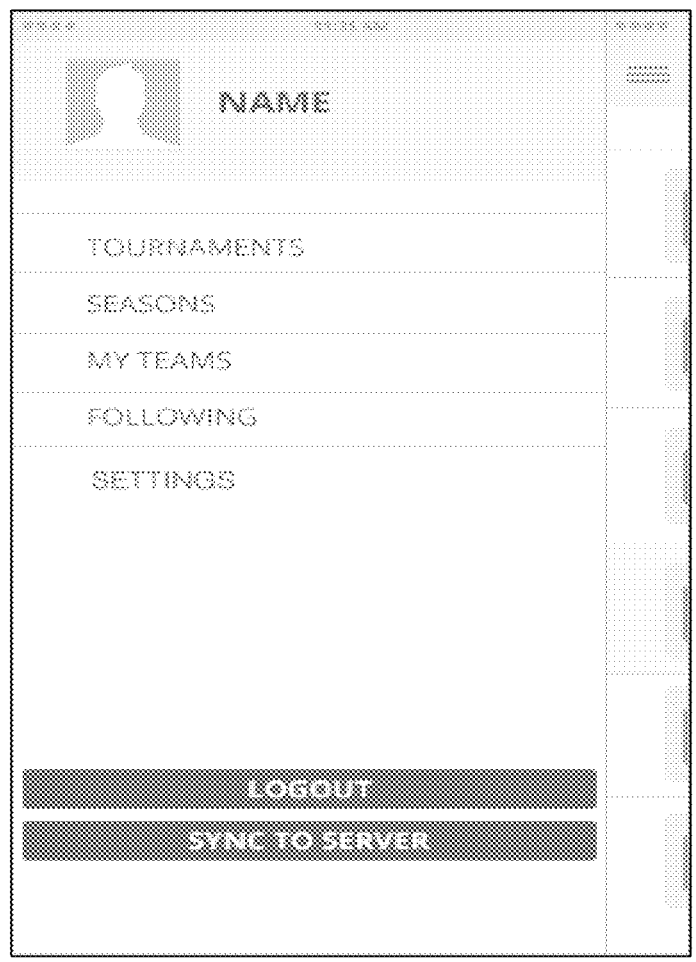

FIG. 8b is a schematic illustration of the online to offline synchronization process, according to the embodiments as disclosed herein.

FIG. 8c is a schematic illustration of creating a tournament, according to the embodiments as disclosed herein. The user is allowed to upload a tournament icon and input other details related to the tournament.

Figure 8D:
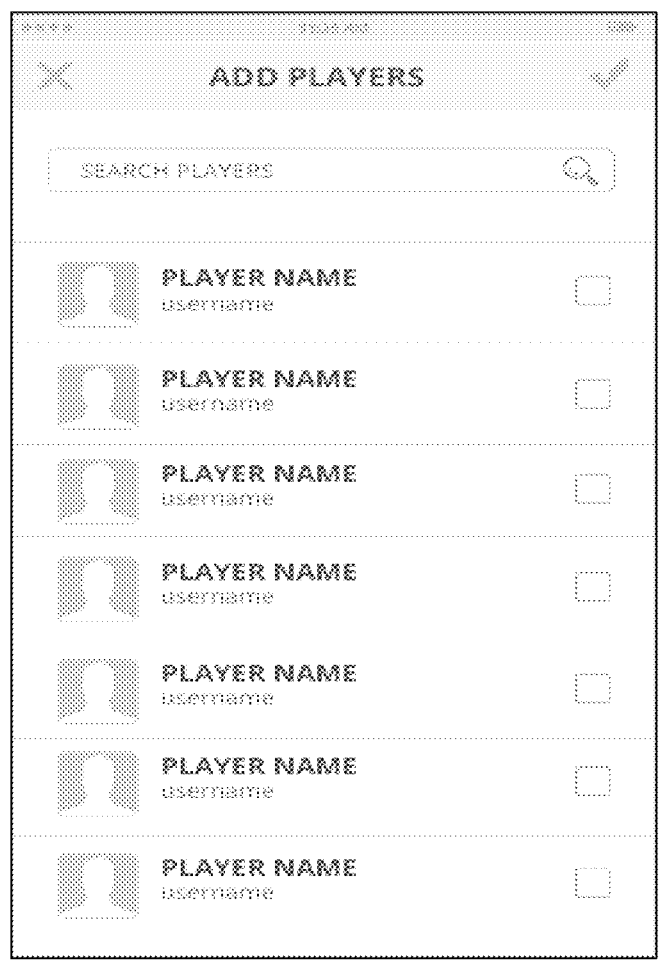
Figure 8E:
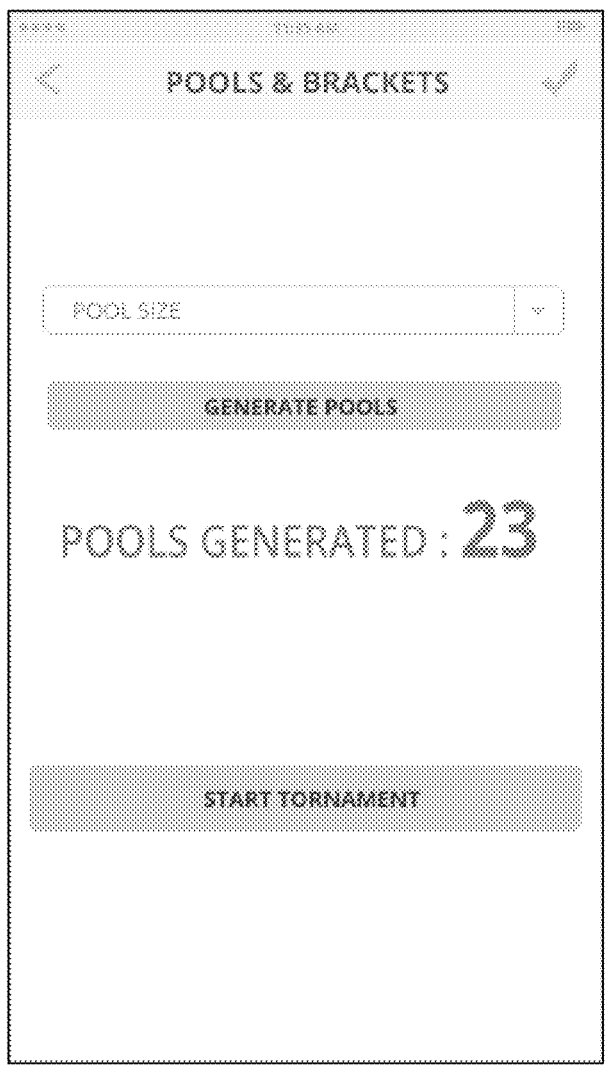

FIG. 8d and FIG. 8e are schematic illustrations of managing a plurality of tournaments, according to the embodiments as disclosed herein. FIG. 8d allows the user to add players and search for specific player(s). A list of players is displayed for the user to select.

FIG. 8e permits the user to generate pools and start tournaments.

Figure 8F:

FIG. 8f is a schematic illustration of a profile-based bracket and auto seeding, according to the embodiments as disclosed herein.

Figure 8G:
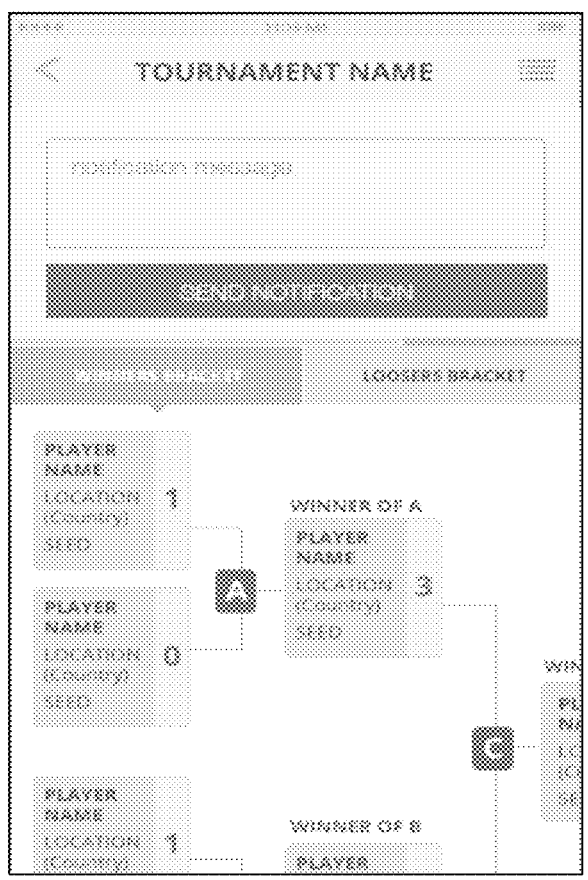

FIG. 8g is a schematic illustration of sending notifications, according to the embodiments as disclosed herein. The web page displays a text space to input the notification message.

Figure 8H:
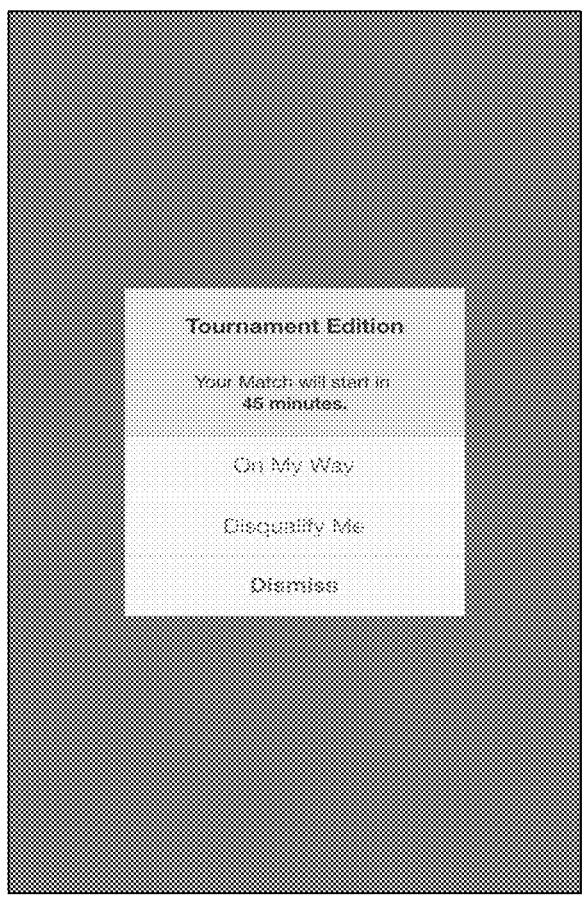

FIG. 8h is a schematic illustration of replying to notifications, according to the embodiments as disclosed herein. The web page displays the tournament edition and allows the user to reply to a notification.

Figure 8I:

FIG. 8i is a schematic illustration of tweeting, according to the embodiments as disclosed herein.

System Block Diagram

Figure 9:
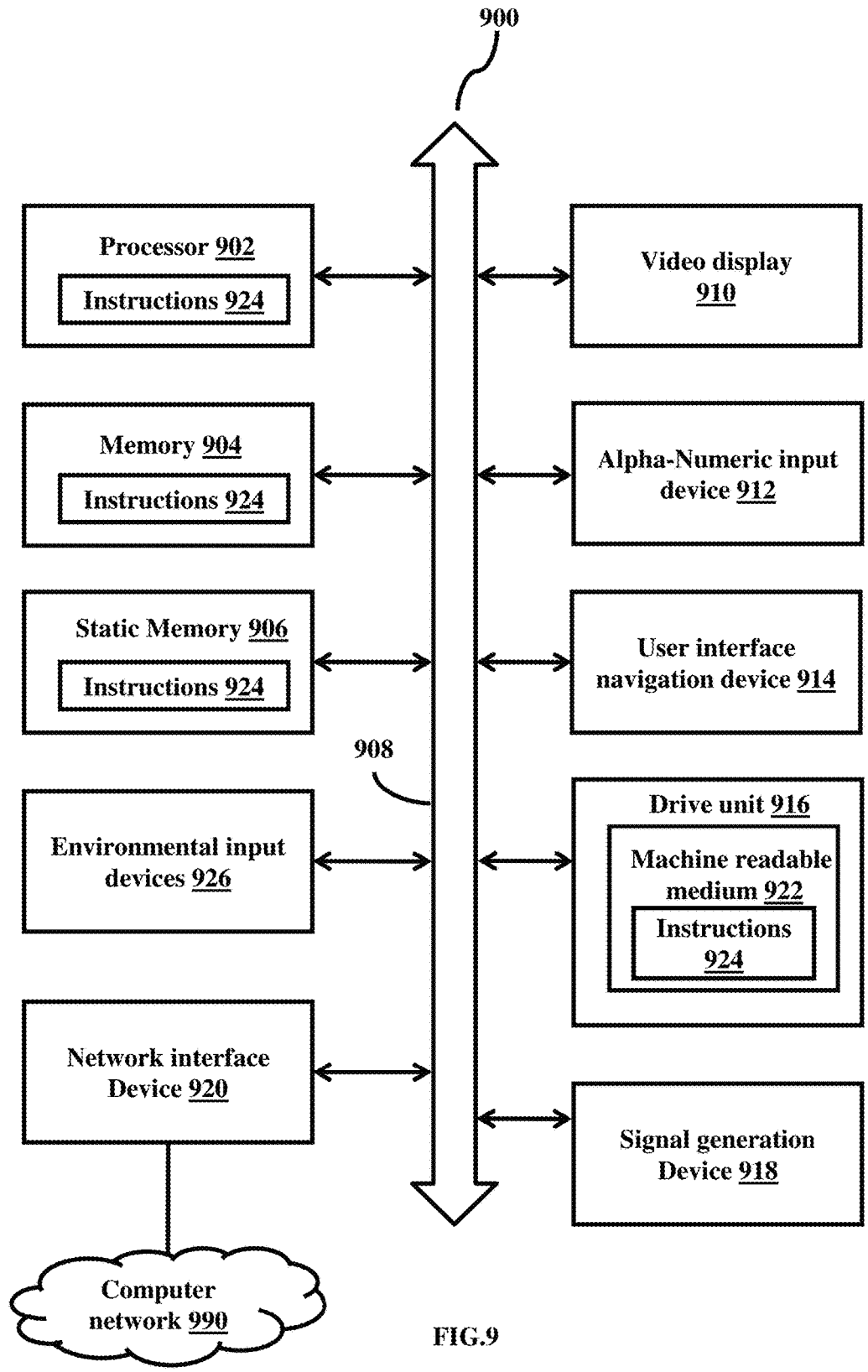
FIG. 9 is a block diagram of a machine in the example form of a computer system within which instructions for causing the machine to perform any one or more of the methodologies discussed herein may be executed.

FIG. 9 is a block diagram of a machine in the example form of a computer system 900 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a memory 904, and a static memory 906, which communicate with each other via a bus 908. The computer system 900 may further include a video display unit 910 (e.g., a liquid crystal display (LCD), Light Emitting Diode (LED), or a cathode ray tube (CRT)). The computer system 900 also includes an alphanumeric input device 912 (e.g., a keyboard), a user interface (UI) navigation device 914 (e.g., a touch-screen, a mouse), a disk drive unit 916, a signal generation device 918 (e.g., a speaker), and a network interface device 920. The computer system 900 may also include a environmental input device 926 that may provide a number of inputs describing the environment in which the computer system 900 or another device exists, including, but not limited to, any of a Global Positioning Sensing (GPS) receiver, a temperature sensor, a light sensor, a still photo or video camera, an audio sensor (e.g., a microphone), a velocity sensor, a gyroscope, an accelerometer, and a compass.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the memory 904 and/or within the processor 902 during execution thereof by the computer system 900, the memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 924 may further be transmitted or received over a computer network 990 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming and scripting languages, such as C, C++, C#, Pascal, Fortran, Perl, Python, Matlab (from MathWorks), SAS, SPSS, JavaScript, AJAX, PHP, and Java. The computer software product can be an independent application with data input and data display modules. Alternatively, the computer software products can be classes that can be instantiated as distributed objects. The computer software products can also be component software or a library of such components, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its substandards a, b, e, g, h, i, n, et al.). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

The invention claimed is:

1. A computer-implemented method for automating and managing tournament logistics and services, the method comprises:

creating tournaments, events, and seasons, and enabling participations, wherein creating comprises uploading tournament icon, and entering tournament name, start date and time, end date and time, a default tweet, and web URL (uniform resource locator) for the tournaments;

creating profile-integrated brackets and automated seeding;

displaying a list of player profiles, tournaments, events, seasons, and a list of players participating in the tournaments, events and seasons to a user;

permitting the user to send and respond to real-time notifications and tweet event information automatically;

providing a single platform to all stakeholders in the tournaments, including tournament organizer, participating player and fans, to send and/or receive data related to the tournament services in real-time; and synchronizing the data when the user swaps between offline and online status to provide continuity to the tournament management and experience, wherein in the offline status, the user is unable to access online hosted data or services comprising player profiles, notifications, and past tournament data but the user has access to creation of new tournaments, addition to players, marking winners and losers in each pool and bracket, wherein the synchronizing comprises:

monitoring, by a monitor update thread, an update to data tiles, wherein the data files enable data display via a graphical user interface to the user, and the data files comprise a plurality of entities for user profile, tournament, event, season specific data, and application programming interface (API) related data, and syncing the data files with a database in response to signals from monitor update thread, the database comprising data entities for user profiles, tournaments, events, and seasons.

2. The computer-implemented method of claim 1 and further comprising:

permitting a user to login to an application utilized to perform the method, wherein the application is user-centric;

allowing the user to create a user profile; and allowing the user to edit settings of the application.

3. The computer-implemented method of claim 1 and further comprising:

allowing the user to view public profile information of other users and available tournament, event and season information.

4. The computer-implemented method of claim 1 and further comprising:

storing user profile data and bracket details in a database, wherein a bracket is a tree diagram that represents the series of matches played during a tournament.

5. The computer-implemented method of claim 1 and further comprising:

providing functions to process bracket data updates, logistics behind the scene, services tangible and intangible to users and financial profit and loss; and providing a database of target tournament, event, and season information.

6. The computer-implemented method of claim 5 wherein the functions are supported by one of a communication mechanism and an online-offline data synchronization mechanism.

7. The computer-implemented method of claim 1 wherein the profile-integrated bracket further comprising:

determining a target bracket style:

creating the bracket for the target tournament;

determining the players and player teams who have agreed to participate in the bracket;

allowing access to profiles of tournament players and tournament player performance;

accessing performance statistics of the player; and integrating the tournament brackets with accessed profile and data into the target brackets.

8. The computer-implemented method of claim 1 wherein the automated seeding function further comprises:

determining seeding priority based on combination of player data comprising geographical location, team affiliation, and past performance record;

generating an automated seeding based on user-selected parameters used for determining seeding priority; and allowing the user to edit the automated seeding result to customize.

9. The computer-implemented method of claim 1 and further comprising:

determining a communication template for the participating player in a tournament;

delivering a notification to one or more selected participating player, wherein the notification is limited to a pre-defined set of notification choices comprising at least one of "time until match start", "late warning", and "disqualification";

displaying a set of pre-defined response choices, wherein the response choices comprise at least one of "on my way" and "disqualify me"; and communicating a response to a sender in response to the player determining a response choice.

10. A computer program product stored on a non-transitory computer readable medium that when executed by a processor, performs a method for automating and managing tournament logistics and services, the computer program product comprises:

creating tournaments, events, and seasons, and enabling participations, wherein creating comprises uploading tournament icon, and entering tournament name, start date and time, end date and time, a default tweet, and web URL (uniform resource locator) for the tournaments;

creating profile-integrated brackets and automated seeding;

displaying a list of player profiles, tournaments, events, seasons, and a list of players participating in the tournaments, events and seasons to a user;

permitting the user to send and respond to real-time notifications and tweet event information automatically:

providing a single platform to all stakeholders in the tournaments, including tournament organizer, participating player and fans, to send and/or receive data related to the tournament services in real-time; and synchronizing the data when the user swaps between offline and online status to provide continuity to the tournament management and experience, wherein in the offline status, the user is unable to access online hosted data or services comprising player profiles, notifications, and past tournament data but the user has access to creation of new tournaments, addition to players, marking winners and losers in each pool and bracket, wherein the synchronizing comprises:

monitoring by a monitor update thread, an update to data files, wherein the data files enable data display via a graphical user interface to the user, and the data files comprise a plurality of entities for user profile, tournament, event, season specific data, and application programming interface (API) related data, and syncing the data files with a database in response to signals from monitor update thread, the database comprising data entities for user profiles, tournaments, events, and seasons.

11. The computer program product of claim 10 and further comprising:

permitting a user to login to an application utilized to perform the method, wherein the application is user-centric;

allowing the user to create a user profile; and allowing the user to edit settings of the application.

12. The computer program product of claim 10 and further comprising:

allowing the user to view public profile information of other users and available tournament, event and season information.

13. The computer program product of claim 10 and further comprising:

storing user profile data and bracket details in a database, wherein a bracket is a tree diagram that represents the series of matches played during a tournament.

14. The computer program product of claim 10 and further comprising:

providing functions to process bracket data updates, logistics behind the scene, services tangible and intangible to users and financial profit and loss; and providing a database of target tournament, event, and season information.

15. The computer program product of claim 14 wherein the functions are supported by one of a communication mechanism and an online-offline data synchronization mechanism.

16. The computer program product of claim 10 wherein the profile-integrated bracket further comprising:

determining a target bracket style;

creating the bracket for the target tournament;

determining the players and player teams who have agreed to participate in the bracket;

allowing access to profiles of tournament players and tournament player performance;

accessing performance statistics of the player; and integrating the tournament brackets with accessed profile and data into the target brackets.

17. The computer program product of claim 10 wherein the automated seeding function further comprises:

determining seeding priority based on combination of player data comprising geographical location, team affiliation, and past performance record;

generating an automated seeding based on user-selected parameters used for determining seeding priority; and allowing the user to edit the automated seeding result to customize.

18. The computer program product of claim 10 and further comprising:

determining a communication template for the participating player in a tournament;

delivering a notification to one or more selected participating player, wherein the notification is limited to a pre-defined set of notification choices comprising at least one of "time until match start", "late warning", and "disqualification";

displaying a set of pre-defined response choices, wherein the response choices comprise at least one of "on my way" and "disqualify me"; and communicating a response to a sender in response to the player determining a response choice.

19. A system for automating and managing tournament logistics and services, the system comprising:

a computing device;

a database to store data related to tournaments, events, seasons, user profile data and bracket details;

a network; and a processing module configured within the computing device and operable to perform:

create tournaments, events, and seasons, and enabling participations, wherein creating comprises uploading tournament icon. and entering tournament name, start date and time, end date and time, a default tweet, and web URL (uniform resource locator) for the tournaments;

create profile-integrated brackets and automated seeding;

display a list of player profiles, tournaments, events, seasons, and a list of players participating in the tournaments, events and seasons to a user;

permit the user to send and respond to real-time notifications and tweet event information automatically;

provide a single platform to all stakeholders in the tournaments, including tournament organizer, participating player and fans, to send and/or receive data related to the tournament services in real-time; and synchronize the data when the user swaps between offline and online status to provide continuity to the tournament management and experience, wherein in the offline status, the user is unable to access online hosted data or services comprising player profiles, notifications, and past tournament data but the user has access to creation of new tournaments, addition to players, marking winners and losers in each pool and bracket, wherein the synchronize comprises:

monitoring, by a monitor update thread, an update to data files, wherein the data files enable data display via a graphical user interface to the user, and the data files comprise a plurality of entities for user profile, tournament, event, season specific data, and application programming interface (API) related data, and syncing the data files with a database in response to signals from monitor update thread, the database comprising data entities for user profiles, tournaments, events, and seasons.

20. The system of claim 19 wherein the computing device includes a graphical user interface to facilitate interaction with a user of the computing device.

* * * * *

UNITED STATES PATENT AND TRADEMARK OFFICE
CERTIFICATE OF CORRECTION

PATENT NO. : 10,135,943 B2
APPLICATION NO. : 15/047622
DATED : November 20, 2018
INVENTOR(S) : Vijay Kumar Palandurkar and Vivan Palandurkar It is certified that error appears in the above-identified patent and that said Letters Patent is hereby corrected as shown below:

On the Title Page

Item (12) "Palandurkar" should read -- Palandurkar et al. --

Inventor, Line 2, add Vivan PALANDURKAR, West Windsor, NJ (US)

Signed and Sealed this
Twenty-third Day of May, 2023

Katherine Kelly Vidal
*Director of the United States Patent and Trademark Office*